US012292343B2

(12) United States Patent
Ottley et al.

(10) Patent No.: US 12,292,343 B2
(45) Date of Patent: *May 6, 2025

(54) SYSTEMS AND METHODS FOR FOLDABLE MULTI-MODE BEND SENSORS

(71) Applicants:Nitto Bend Technologies, Inc., Farmington, UT (US); Nitto Denko Corporation, Osaka (JP)

(72) Inventors: Colton A. Ottley, Farmington, UT (US); Jared K. Jonas, Seattle, WA (US); Colin D. Eichinger, Salt Lake City, UT (US); Nathan Grimes, Bountiful, UT (US); Nathan C. Briggs, Ogden, UT (US)

(73) Assignee: Nitto Bend Technologies, Inc., Farmington, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,381

(22) Filed: Nov. 14, 2023

(65) Prior Publication Data

US 2024/0085251 A1    Mar. 14, 2024

Related U.S. Application Data

(63) Continuation of application No. 17/534,297, filed on Nov. 23, 2021, now Pat. No. 11,852,546.
(Continued)

(51) Int. Cl.
*G01L 1/14* (2006.01)
(52) U.S. Cl.
CPC .................................. *G01L 1/142* (2013.01)

(58) Field of Classification Search
CPC ......... G01L 1/142; G01L 1/144; G01L 1/146; G01L 5/101; G01B 7/22; G01D 5/24;
(Continued)

(56) References Cited

U.S. PATENT DOCUMENTS

2009/0033312 A1    2/2009  Trethewey
2009/0295557 A1   12/2009  Fischer et al.
(Continued)

FOREIGN PATENT DOCUMENTS

WO    2016168572 A1   10/2016
WO    2017165809 A1    9/2017
(Continued)

OTHER PUBLICATIONS

US Patent and Trademark Office (ISA); International Search Report and Written Opinion for Application No. PCT/US21/60779 dated Feb. 11, 2022.
(Continued)

*Primary Examiner* — Herbert K Roberts
(74) *Attorney, Agent, or Firm* — Parsons Behle & Latimer

(57) ABSTRACT

Disclosed embodiments include systems and methods for additively manufacturing (e.g., by "printing" or the like) a bend sensor as a 2D structure that can then be configured into a 3D or stacked structure. Further disclosed embodiments include bend sensors with foldable sensing regions configurable into a 3D or stacked structure. A differential strain in a sensing region is linearly proportional to the displacement as measured from the endpoints of the sensing region. The differential strain is measurable as a differential change in the capacitance of the sensing regions.

17 Claims, 5 Drawing Sheets

Related U.S. Application Data

(60) Provisional application No. 63/118,561, filed on Nov. 25, 2020.

(58) Field of Classification Search
CPC ............... A61B 5/1036; A61B 5/1038; A61B 2562/0261; G06F 3/0414; G06F 3/044; G06F 3/0445; G06F 3/0446
See application file for complete search history.

(56) References Cited

U.S. PATENT DOCUMENTS

| | | |
|---|---|---|
| 2010/0308907 A1 | 12/2010 | Xiang et al. |
| 2017/0153153 A1 | 6/2017 | Eventoff et al. |
| 2017/0273599 A1 | 9/2017 | Reese et al. |
| 2017/0315658 A1 | 11/2017 | Vandermeijden et al. |
| 2020/0085299 A1 | 3/2020 | Xu et al. |
| 2020/0187355 A1 | 6/2020 | Kraemer et al. |
| 2020/0209085 A1 | 7/2020 | Wettels et al. |
| 2020/0379591 A1 | 12/2020 | Reynolds et al. |
| 2022/0252475 A1 | 8/2022 | Hussein |
| 2023/0008775 A1 | 1/2023 | Omote et al. |

FOREIGN PATENT DOCUMENTS

| | | |
|---|---|---|
| WO | 2020228872 A1 | 11/2020 |
| WO | WO2021178756 A2 | 9/2021 |

OTHER PUBLICATIONS

US Patent and Trademark Office; Office Action for U.S. Appl. No. 17/534,297 dated May 2, 2023.

European Patent Office; Extended European Search Report for Application No. 21899101.6 dated Oct. 21, 2024 Oct. 21, 2024.

SYSTEMS AND METHODS FOR FOLDABLE MULTI-MODE BEND SENSORS

CROSS-REFERENCE TO RELATED APPLICATIONS

This application, under 35 U.S.C. § 119, claims the benefit of U.S. Provisional Patent Application Ser. No. 63/118,561 filed on Nov. 25, 2020, and entitled "SYSTEMS AND METHODS FOR FOLDABLE MULTI-MODE BEND SENSORS," and is a continuation of application Ser. No. 17/534,297, filed Nov. 23, 2021, and entitled "SYSTEMS AND METHODS FOR FOLDABLE MULTI-MODE BEND SENSORS" the contents of which are hereby incorporated by reference herein. the contents of which are hereby incorporated by reference herein.

This application is also related to the following U.S. Pat. Nos. 8,941,392; 9,222,764; 9,476,692; 9,612,102; 9,874,431; 10,551,917; 10,823,546; and 10,959,644, and to co-pending U.S. patent application Ser. No. 17/387,709, the contents of which are all hereby incorporated by reference herein.

FIELD OF THE DISCLOSURE

This disclosure relates to force, strain, flex, bend, or the like, sensor systems and methods. More particularly, this disclosure relates to systems and methods for manufacturing lower weight sensors, using less material to make the same, and improving signal response in flexible, extensible, compliant, bendable, or the like, capacitive sensor systems and methods.

BACKGROUND

There is often a need for a flexible, extensible, compliant, force, strain, bend, or the like, (as used herein, collectively "bend," "bendable," or "bending") sensor. For example, a medical device sensor system may use a bending force sensor as part of a limb brace, or the like. Likewise, structural monitoring systems, such as bridge or building monitors, may use a bending force sensor to detect structural movement, or the like. However, with existing systems and methods it is often difficult, costly, or otherwise inconvenient to manufacture a lightweight bend sensor, or to avoid differential signals from sensor traces causing in accurate angular displacement measurements.

Additionally, bend sensor systems often include distributed sensing regions that include electrical connections (e.g., traces) of varying lengths. The variation in length can cause a related variance in base capacitance levels of the sensing regions that can be problematic and otherwise inconvenient to compensate for in the electronic circuitry.

Furthermore, bendable sensor systems with distributed sensing regions may also experience mechanical crosstalk in regions where traces flex and/or strain induce errant capacitance signals. The crosstalk from the traces can be significant in regions with relatively large surface area coupled to a ground electrode.

Additionally, bend sensor systems often include distributed sensing regions that include traces (e.g., electrical connections) of varying lengths or in various spatial planes. The variation in length or plane can cause a related variance in base capacitance levels of the sensing regions that can be problematic and otherwise inconvenient to compensate for in the electronic circuitry.

Other drawbacks, inconveniences, inefficiencies, and issues also exist with current systems and methods.

SUMMARY

Disclosed systems, methods, and articles of manufacture address the above, and other, drawbacks, inconveniences, inefficiencies, and issues with current systems and methods. Other advantages and efficiencies of disclosed systems and methods also exist.

As used herein, "flexible," "extensible," "compliant," "bending," and the like are used somewhat interchangeably and all mean that there is some amount of flexing, stretching, twisting, bending, or the like, of the described embodiment.

Disclosed embodiments include systems and methods for additively manufacturing (e.g., by "printing" or the like) a bend sensor as a 2D structure that can then be configured into a 3D or stacked structure.

Further disclosed embodiments include bend sensors with foldable sensing regions configurable into a 3D or stacked structure. In accordance with disclosed embodiments, differential strain in a sensing region is linearly proportional to the displacement as measured from the endpoints of the sensing region. In some embodiments, the differential strain is measurable as a differential change in the capacitance of the sensing regions.

Further disclosed embodiments include bend sensors, and methods of manufacturing the same, with traces (e.g., electrical connections) to the sensing regions configured to reside in substantially the same plane. In accordance with disclosed embodiments, associated signal measuring electronics (e.g., amplifiers or the like) subtract off common mode signal between two traces. Some disclosed embodiments have higher common mode rejection ratio from traces because they are all in substantially the same plane.

Other disclosed embodiments include a signal electrode for a compliant sensor, the signal electrode including an elastomeric layer, a first sensor region within the elastomeric layer and having a conductive material, a narrowed region connected to the elastomeric layer and having a fold line region, and a foldable sensor region connected to the narrowed region and having conductive material, wherein the foldable sensor region is configured to be positioned above the first sensor region when the narrowed region is folded at the fold line region.

Other disclosed embodiments include a first trace within the elastomeric layer providing an electrical connection to the first sensor region, and a second trace within the elastomeric layer extending through the narrowed region and providing electrical connection to the foldable sensor region. In some disclosed embodiments, the narrowed region is configured to form a looped region when bent at the fold line region. In other disclosed embodiments, the narrowed region is configured to be attached to the elastomeric layer when bent at the fold line region.

In some disclosed embodiments, the foldable sensor region is formed in an inset configuration within the elastomeric layer and is substantially separated from the elastomeric layer by a perimeter that is substantially devoid of elastomeric material.

Also disclosed is a multi-mode compliant sensor including a signal electrode layer having an elastomeric layer, a first sensor region within the elastomeric layer and having conductive material, a narrowed region connected to the elastomeric layer and having a fold line region, and a foldable sensor region connected to the narrowed region and having conductive material, wherein the narrowed region is folded at the fold line region and the foldable sensor region is positioned above the first sensor region, and a dielectric interposer positioned between the first sensor region and the foldable sensor region, the combination forming a first compliant capacitor.

Further disclosed embodiments include a first trace within the elastomeric layer providing an electrical connection to the first sensor region, and a second trace within the elastomeric layer providing electrical connection to the foldable sensor region and located in substantially the same plane as the first trace except for a portion that extends through the narrowed region.

Further disclosed embodiments include a cover dielectric layer on at least one side of the signal electrode layer.

Further disclosed embodiments include a second sensor region within the elastomeric layer and having conductive material, a second narrowed region connected to the elastomeric layer and having a second fold line region, and a second foldable sensor region connected to the second narrowed region and having conductive material, wherein the second narrowed region is folded at the second fold line region and the second foldable sensor region is positioned above the second sensor region, and a second dielectric interposer positioned between the second sensor region and the second foldable sensor region, the combination forming a second compliant capacitor.

Further disclosed embodiments include a control circuit having a microcontroller comprising at least three operational amplifiers configured to operate as an instrumentation amplifier with programmable gain, a first resistor, a second resistor, and a digital-to-analog converter, and wherein the first resistor and the second resistor convert a current charging the first and second compliant capacitors into voltage, and the instrumentation amplifier converts the differential signal into a single ended voltage output. In some embodiments, the output of the instrumentation amplifier is routed to the analog to digital converter that produces a value that is linearly proportional to the differential capacitance of the first and second capacitors. Other embodiments, features, and advantages also exist.

Figure 1A:
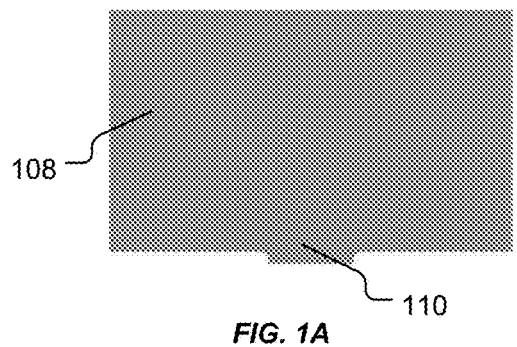
FIGS. 1A-G are illustrations of electrode and shielding systems for a bendable sensor system in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

FIGS. 1A-G are illustrations of electrode and shielding systems for a bendable three-electrode stack sensor system in accordance with disclosed embodiments. As shown in FIG. 1A, a first cover dielectric layer 108 may optionally be provided in some embodiments. First cover dielectric layer 108 may comprise an elastomeric material such as silicone, or the like. First cover dielectric layer 108 may be used to cover top electrode layer 102 (disclosed below with FIG. 1B) to prevent the top electrode layer 102 from unwanted contact with other objects, surfaces, or the like. While not drawn rigorously to scale, first cover dielectric layer 108 is sized to cover top electrode layer 102 and may be larger than top electrode layer 102 in some embodiments. As also indicated, first cover dielectric layer 108 includes a tab portion 110 for covering top electrode layer 102 up to conductive trace pads 106.

Figure 1B:
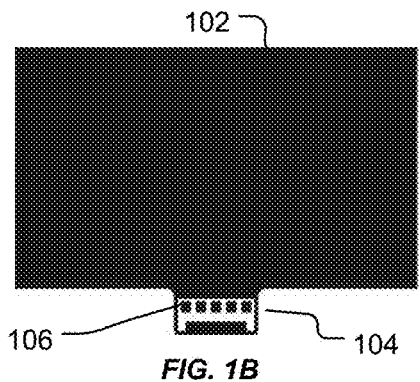

FIG. 1B shows a top electrode layer 102 that may be provided. Top electrode layer 102 can comprise an elastomeric layer (e.g., silicone) with conductive particles (e.g., nano-particles, such as carbon black, nickel nano-strands, graphene nano-platelets, graphene-oxides, or the like) integrated within. Top electrode layer 102 may also include a PCB interface 104 and a number of conductive trace pads 106 for attaching a PCB, sensor traces, or other electronics, for operation and control of the sensor system.

Figure 1C:
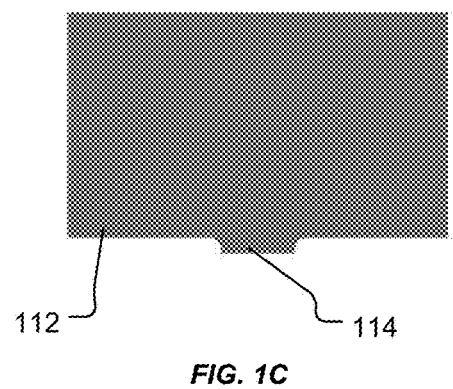

FIG. 1C shows a second dielectric, layer 112. Second dielectric layer 112 may comprise an elastomeric material (e.g., silicone) and, as desired, may have some conductive material integrated within depending upon, among other things, the intended amount of permittivity, or the like. While not drawn rigorously to scale, second dielectric layer 112 is sized to be slightly smaller than top electrode layer 102 to leave a perimeter edge of top electrode layer 102 uncovered by dielectric layer 112 and allow electrical contact with perimeter electrode 140 as disclosed herein. Embodiments of second dielectric layer 112 may also include a tab portion 114 sized to cover PCB interface 104 up to the trace pads 106.

Figure 1D:
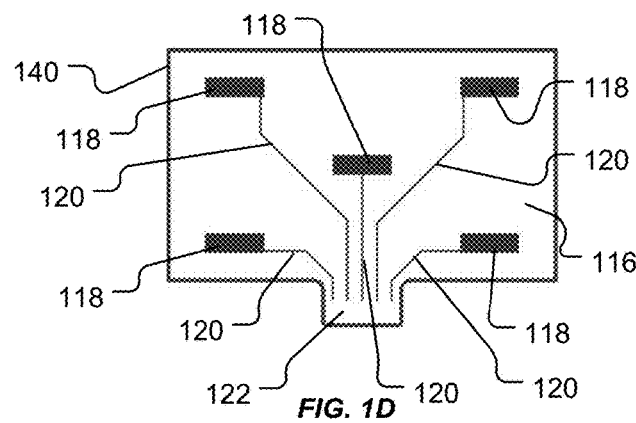

FIG. 1D shows a signal electrode layer 116. Embodiments of signal electrode layer 116 may comprise an elastomeric material (e.g., silicone) with conductive material (e.g., nano-particles, such as carbon black, nickel nano-strands, silver nano-particles, graphene nano-platelets, graphene-oxides, or the like) confined to the sensor regions 118, traces 120, and perimeter electrode 140. As shown, a number of sensor regions 118 may be distributed throughout the layer 116. Sensor regions 118 may comprise regions of electrically conductive material. Sensor regions 118 are electrically in communication with traces 120 that are printed with signal electrode layer 116. Traces 120 terminate at a tab region 122 that aligns with trace pads 106 to provide electrical connection points for traces 120. As shown, embodiments of signal electrode layer 116 may include a perimeter electrode 140 that electrically connects to top electrode layer 102 and bottom electrode layer 132 to, among other things, provide electrical isolation for the entire sensor system.

Figure 1E:
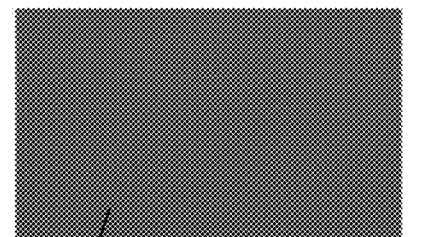

FIG. 1E shows a third dielectric layer 124. Third dielectric layer 124 may comprise an elastomeric material (e.g., silicone) and, as desired, may have some conductive material integrated within depending upon, among other things, the intended amount of permittivity, or the like. While not drawn rigorously to scale, third dielectric layer 124 is sized to be slightly smaller than bottom electrode layer 132 to leave a perimeter edge of bottom electrode layer 132 uncovered by third dielectric layer 124 and allow electrical contact with perimeter electrode 140 as disclosed herein. Embodiments of third dielectric layer 124 may also include a tab portion 126 sized to cover PCB interface 104 up to the trace pads 106.

Figure 1F:
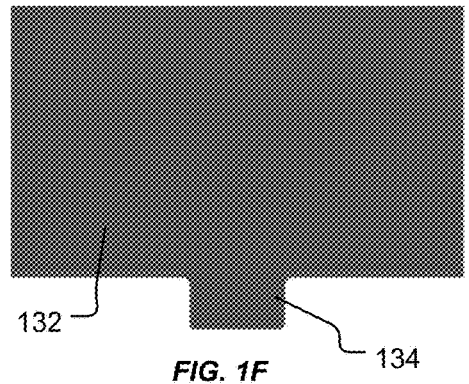

FIG. 1F shows a bottom electrode layer 132 that may be provided. Bottom electrode layer 132 can comprise an elastomeric layer (e.g., silicone) with conductive particles (e.g., nano-particles, such as carbon black, nickel nano-strands, graphene nano-platelets, graphene-oxides, or the like) integrated within. As also indicated, bottom electrode layer 132 includes a tab portion 134 for, among other things, providing mechanical strength for the connective region (e.g., PCB interface 104) for the trace pads 106 to be printed onto, as opposed to tab portions 110, 114 which are pulled back as to not cover the electrically conductive pads 106. Other configurations are also possible.

Figure 1G:
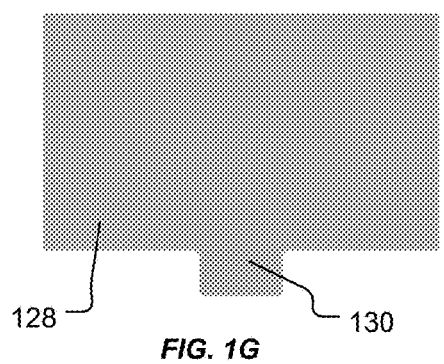

FIG. 1G shows a second cover dielectric layer 128 that may optionally be provided in some embodiments. Second cover dielectric layer 128 may comprise an elastomeric material such as silicone, or the like. Second cover dielectric layer 128 may be used to cover bottom electrode layer 132 (disclosed above with FIG. 1F) to prevent the bottom electrode layer 132 from unwanted contact with other objects, surfaces, or the like. While not drawn rigorously to scale, second cover dielectric layer 128 is sized to cover bottom electrode layer 132 and may be larger than bottom electrode layer 132 in some embodiments. As also indicated, second cover dielectric layer 128 includes a tab portion 130 for supporting the connective region (e.g., PCB interface 104) for the trace pads 106.

As persons of ordinary skill in the art having the benefit of this disclosure would understand, the three-electrode stack shown in FIGS. 1A-G may be extended to more, or less, electrode layers. Likewise, more or less sensor regions 118 and traces 120 may be used in other configurations and shapes.

Further, and as disclosed in related U.S. application Ser. No. 17/387,709, which is incorporated herein by reference, one or more of top electrode layer 102, bottom electrode layer 132, or both, may include a partially open, checkered, or hatched portion of an electrically conducting material such as carbon nanotubes, silver nanoparticles, other conductive particles, or the like, that is printed on a elastomeric substrate (e.g., silicone or the like). One advantage of the hatched portion is that it provides similar electric shielding for a capacitive sensor with a reduced stray capacitance from the traces (e.g., 120) due to the reduced surface area of the traces coupling to the top (e.g., 102) and bottom (e.g., 132) electrodes. Such a configuration results in less error signal generated by strain and or flexion in the traces. The reduction of the error signal is proportional to the amount of surface area that is removed by the hatched portion. Embodiments of the hatched portion may vary the open space amounts according to, among other things, the signal frequencies to be shielded, the width of the traces 120, and the like. In general, wider traces 120 produce more error signal (mechanical crosstalk) and for those embodiments a more aggressive hatching portion (i.e., larger voids) will further reduce the crosstalk.

Additionally, embodiments of the sensor system may include hatched portions where the direction of hatching is a "rectangular" grid that is substantially orthogonal (i.e., intersects in 90° angles) and substantially aligned (i.e., parallel) with the layer edges in each direction. Persons of ordinary skill having the benefit of this disclosure would understand that other alignments are also possible. For example, hatching may be aligned at substantially 45° with respect to layer edges. One advantage of this angled hatching is, depending upon orientation and width of the traces (e.g., 120) the amount of coupling may decrease with 45° or 90° hatching. Additionally, manufacturing tolerances may be better with a particular angle for the hatched portion. In some embodiments top layer (e.g., 102) and bottom layer (e.g., 132) may have differing hatched portions. Other configurations are also possible.

Figure 2:
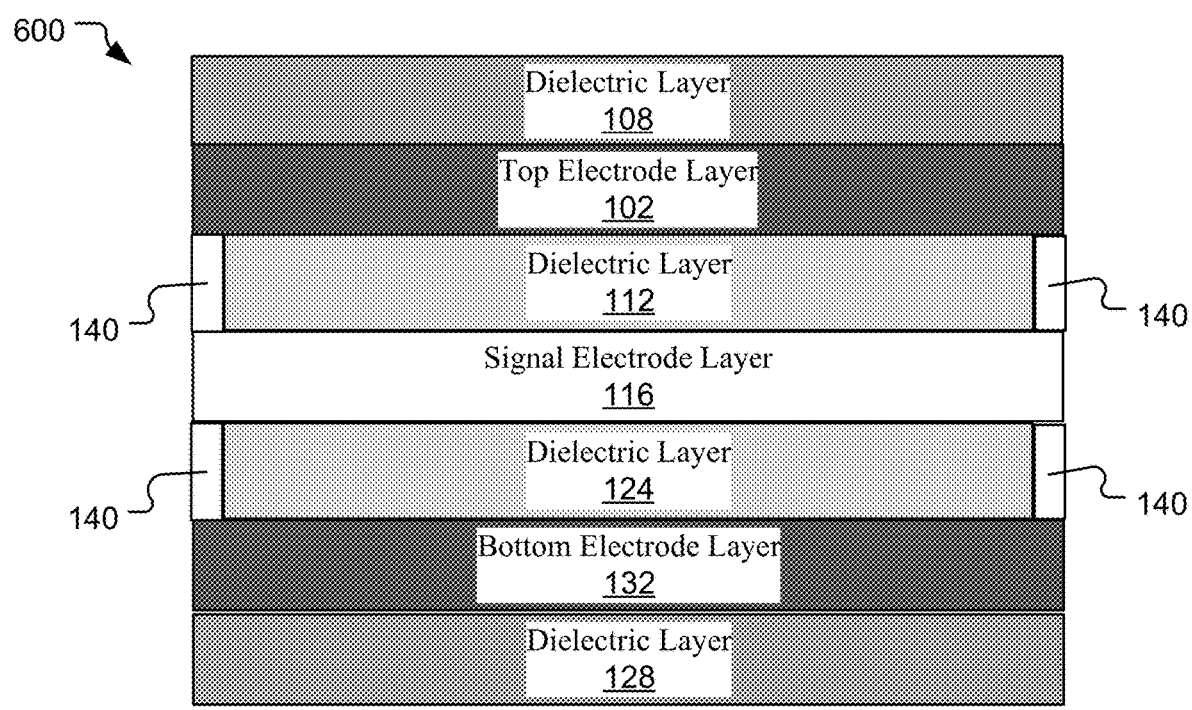
FIG. 2 is a cross-sectional schematic view of a sensor system 600 in accordance with disclosed embodiments.

FIG. 2 is a cross-sectional schematic view of a sensor system 600 in accordance with disclosed embodiments. As shown, embodiments of sensor system 600 may include a top electrode layer (e.g., 102), bottom electrode layer (e.g., 132), signal electrode layer (e.g., 116) and a number of dielectric layers (e.g., 108, 112, 124, 128). The actual layers used may depend, among other things, on the application, type of sensing desired, environment for the sensor, and the like. As persons of ordinary skill in the art having the benefit of this disclosure would understand, more, less, different, various thickness, various materials, and the like, layers may be used. As also shown, embodiments of signal electrode layer 116 may include a perimeter electrode 140 that electrically connects to top electrode layer 102 (and in some embodiments a bottom electrode layer (e.g., 132) to, among other things, provide electrical isolation for the entire sensor system.

Figure 3:
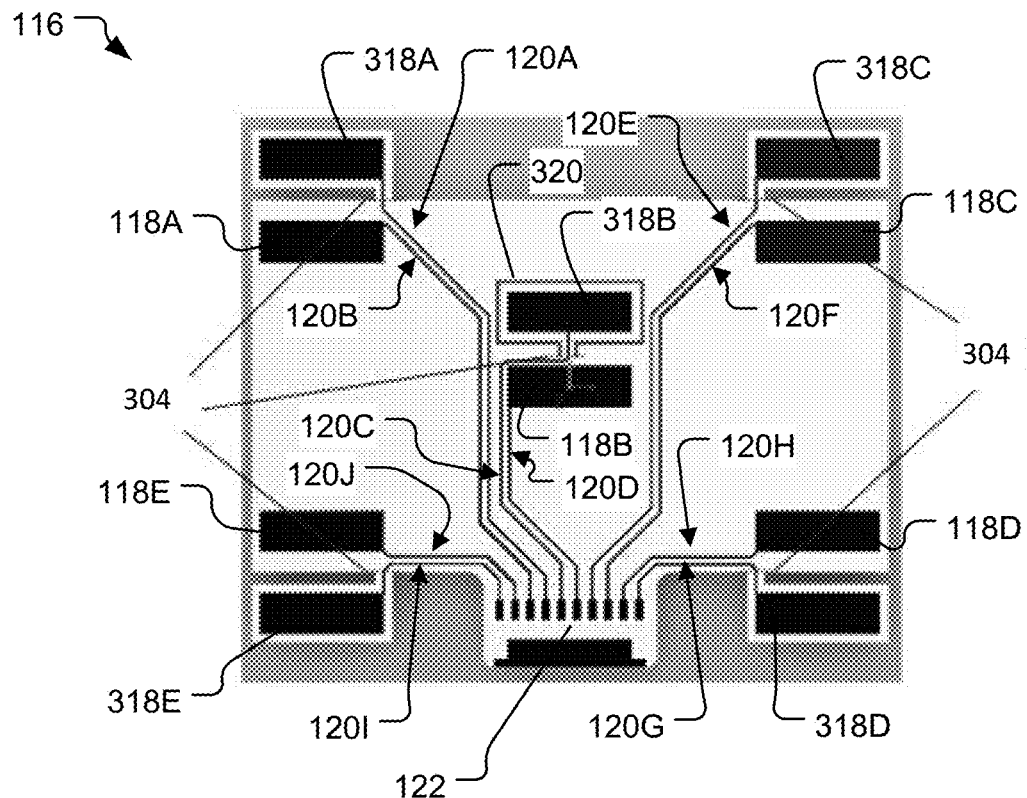
FIG. 3 is a top-view, schematic illustration of a signal electrode with foldable regions in accordance with disclosed embodiments.

FIG. 3 is a top-view, schematic illustration of a signal electrode layer 116 with foldable sensor regions 318A-E in accordance with disclosed embodiments. Foldable sensor regions 318A-E may include a narrowed region intended to be the folding point, or fold line 304, as indicated on FIG. 3. As disclosed herein, foldable sensor regions 318A-E fold over "on top of" sensor regions 118A-E as disclosed in more detail below. As indicated, an inset configuration for foldable sensor region 318B may be formed by substantially omitting elastomeric material around the perimeter of foldable sensor region 318B as indicated at perimeter 320. As disclosed herein, embodiments of signal electrode layer 116 may comprise an elastomeric material (e.g., silicone) with areas intended to conduct electricity (e.g., sensor regions 118A-E, 318A-E, and traces 120A-J) that may comprise an elastomeric layer (e.g., silicone) with conductive particles (e.g., nano-particles, such as carbon black, nickel nano-strands, silver nano-particles, graphene nano-platelets, graphene-oxides, or the like) integrated within. Embodiments of signal electrode layer 116 may also include an electronics connection tab region 122 for connecting to a printed circuit board (PCB), or other electronics, for operation and control of the bend sensor as disclosed herein.

As will be understood by persons of ordinary skill in the art having the benefit of this disclosure, the signal electrode layer 116 of FIG. 3 may be combined with dielectric layers (e.g., 108, 112, 124, 128) and top (e.g., 102) or bottom (e.g., 132) electrode layers as desired and schematically shown in FIG. 2. Of course, greater, or fewer, sensing regions 118A-E, 318A-E, other shaped sensing regions 118A-E, 318A-E, other sensing region 118A-E, 318A-E locations, other fold line 304 placements, and the like, may be used.

Figure 4:
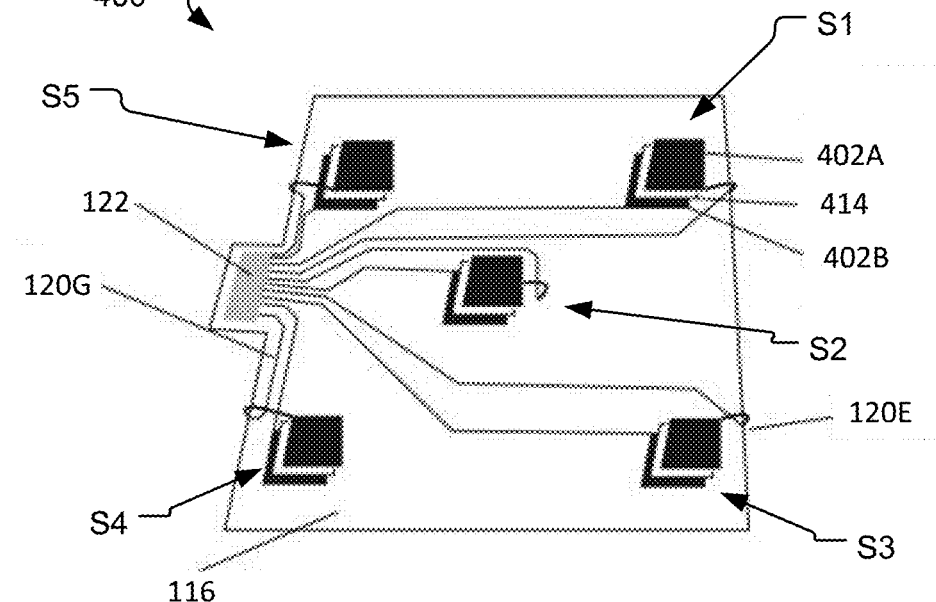
FIG. 4 is a schematic, isometric, right-side view of a bend sensor in accordance with disclosed embodiments.

FIG. 4 is a schematic, isometric, right-side view of a bend sensor 400 in accordance with disclosed embodiments. As shown schematically, foldable sensor regions 318A-E have been folded over each fold line 304 (i.e., sensor region 318A is folded to be on top of (i.e., in a z-axis direction perpendicularly "out" of the plane of signal electrode layer 116) sensor region 118B, etc.) to form multi-mode sensing regions S1-S5 as explained more completely below. In the schematic representation of FIG. 4 layers other than signal electrode 116 (e.g., dielectric, cover, top and bottom electrodes, etc.) are not show for clarity purposes. As also shown schematically, a portion of each trace 120 that is in the fold line portion 304 is likewise folded over (as shown for traces 120E, 120G) leaving most of the respective traces in the signal electrode layer 116. As disclosed herein, with traces (e.g., 120A-J) to the multi-mode sensing regions S1-S5 residing in substantially the same plane (e.g., that of signal electrode layer 116), associated signal measuring electronics (not shown) may subtract off common mode signals between any pair of capacitors in a multi-mode sensing region (e.g., for S1, between top capacitor 402A and bottom capacitor 402B). Among other things, this can result in embodiments that have a higher common mode rejection ratio from paired capacitors because their respective traces 120 are all in substantially the same plane and, with the common mode signals subtracted out, the remaining differential signal is due to differences in the bending of the capacitors.

As also shown schematically in FIG. 4, each capacitor pair (i.e., for S1, capacitors 402A, 402B) may also have an interposer 414 positioned in between. Embodiments of interposer 414 may comprise a dielectric layer, or the like, composed of an elastomeric material (e.g., silicone) and, as desired, may have some conductive material integrated within depending upon, among other things, the intended amount of permittivity, or the like. In some embodiments interposer 414 may comprise a separate component that is positioned prior to folding of foldable sensor regions 318A-E, or it may be an additively manufactured layer (e.g., printed) on top of signal electrode layer 116. Other configurations and manufacturing processes are also possible.

Figure 5:
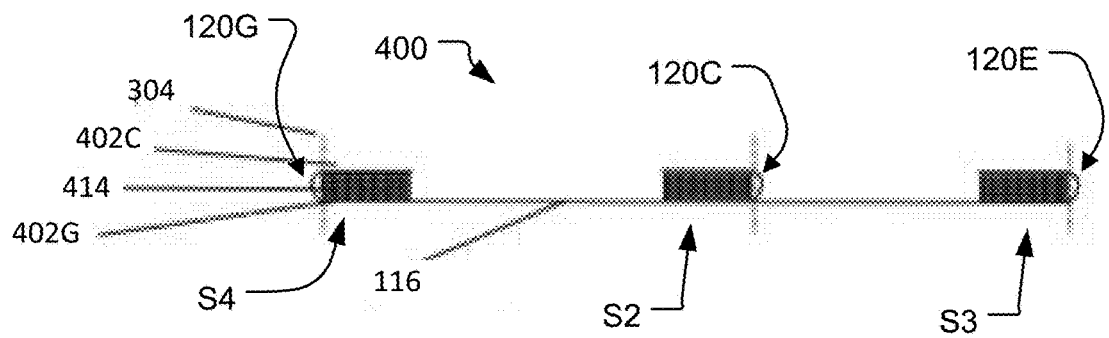
FIG. 5 is a schematic, end-on, right side view of the bend sensor of FIG. 4.

FIG. 5 is a schematic, end-on, right side view of the bend sensor 400 of FIG. 4 (with additional reference to FIG. 3, some reference numbers removed for clarity). As indicated schematically, top electrode traces (e.g., 120G, 120C, 120E, and not shown in FIG. 5 traces 120A and 120I) may be free folded, meaning they are bent, forming loops, and are not otherwise in contact with the bend sensor 400 surface. As shown capacitor pairs (e.g., 402C and 402D) may have an interposer 114 in between.

Figure 6:
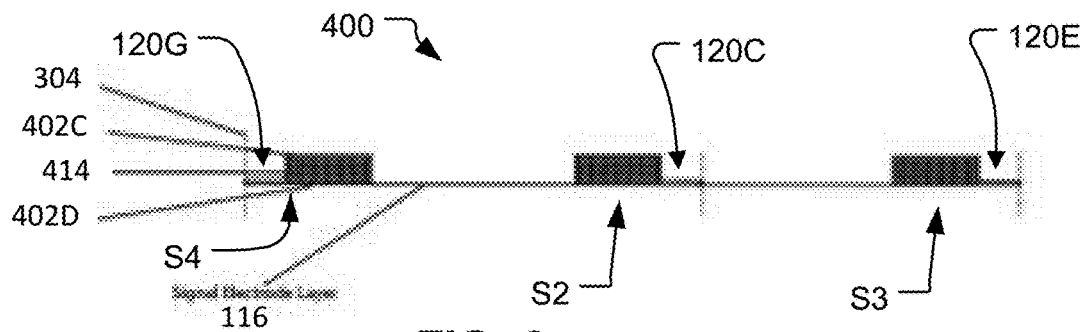
FIG. 6 is a schematic, end-on, right side view of a bend sensor illustrating force down folding of the electrode traces in accordance with disclosed embodiments.

FIG. 6 is a schematic, end-on, right side view of a bend sensor 400 illustrating force down folding of the electrode traces (120G, 120C, 120E) in accordance with disclosed embodiments (some reference numbers removed for clarity). For these embodiments, the folding traces (e.g., 120G, 120C. 120E, and not shown in FIG. 6 traces 120A and 120I) are mechanically, or otherwise, attached to bend sensor 400 surface, or may be formed using an inset configuration (see, e.g., FIG. 3, fold line 304 between 318B and 118B and perimeter 320 lacking elastomeric material). This may be done for to use less silicone, for size or outer perimeter considerations, or the like.

Figure 7:
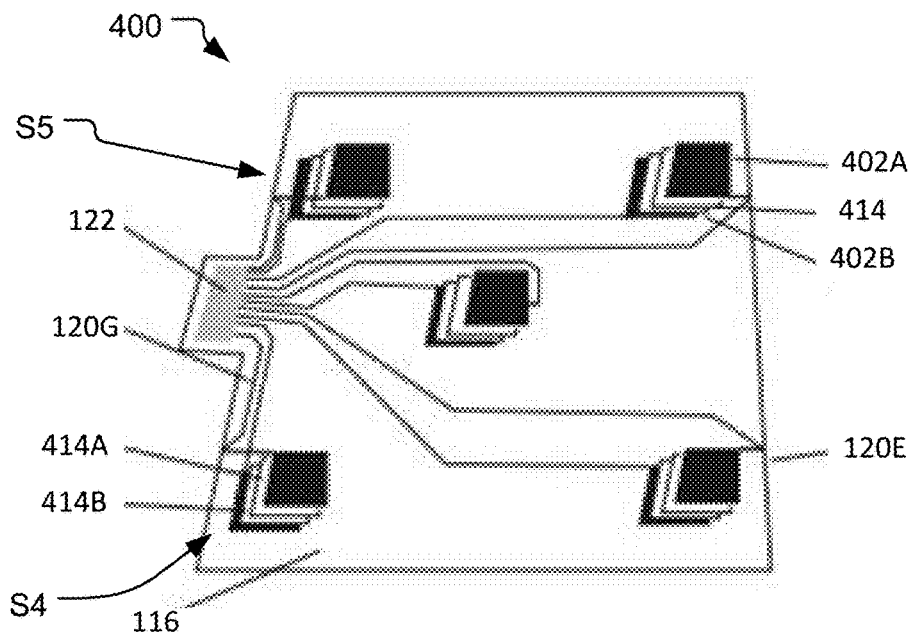
FIG. 7 is a schematic, isometric, right-side view of a bend sensor illustrating multiple interposers for each sensing region in accordance with disclosed embodiments.

FIG. 7 is a schematic, isometric, right-side view of the bend sensor 400 illustrating multiple interposers (414A, 414B) for each multi-mode sensing region S1-S5 in accordance with disclosed embodiments (some reference numbers removed for clarity). As illustrated, more than one interposer (e.g., 414A, 414B) may be used at one or more of the sensing regions S1-S5. As above, embodiments of interposers 414A-B may comprise a dielectric layer, or the like, composed of comprise an elastomeric material (e.g., silicone) and, as desired, may have some conductive material integrated within depending upon, among other things, the intended amount of permittivity, or the like. In some embodiments interposers 414A-B may comprise a separate component that is positioned prior to folding of foldable sensor regions 318A-E, or it may be an additively manufactured layer (e.g., printed) on top of signal electrode layer 116. Other configurations and manufacturing processes are also possible.

As will be apparent to those of ordinary skill in the art having the benefit of this disclosure, the number of sensor regions (318, 118), interposers 414, traces 120, and the like, may depend, among other things, on the application, type of sensing desired, environment for the sensor, and the like. As persons of ordinary skill in the art having the benefit of this disclosure would understand, more, less, different, and various thickness layers, various materials, air-gaps, and the like, may be used.

Figure 8:
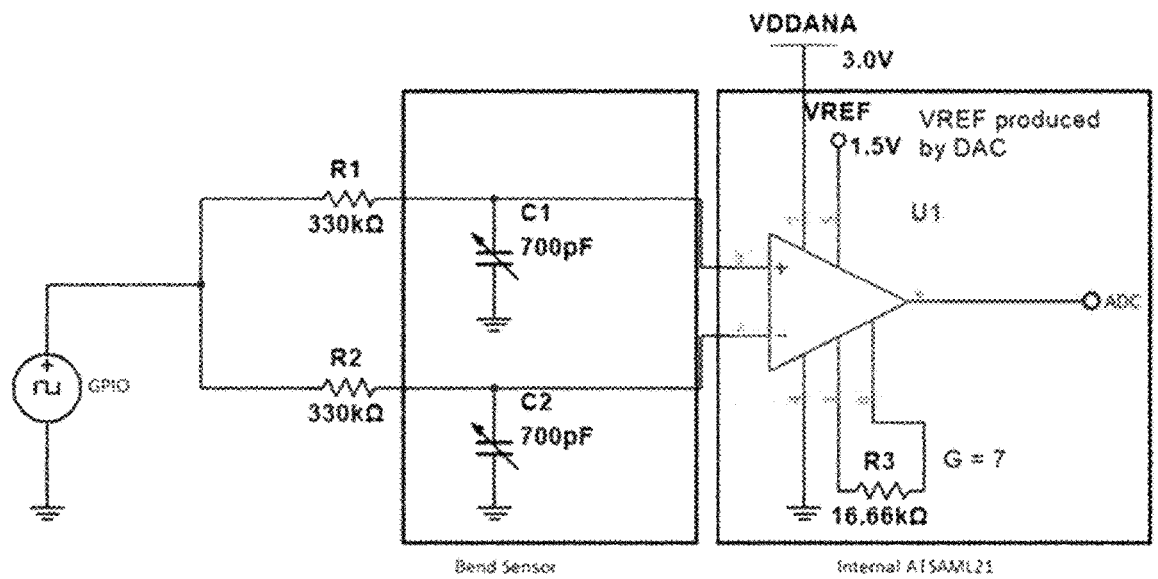
FIG. 8 is a schematic representation of an electronic circuit that can be used to control and measure a multi-mode bend sensor in accordance with disclosed embodiments.

FIG. 8 is a schematic representation of an electronic circuit that can be used to control and measure a multi-mode bend sensor in accordance with disclosed embodiments. As illustrated, a suitable microcontroller, such as a SAML21, or ATSAML21, supplied by Microchip Technology, may be used. Other microcontrollers may also be used.

As illustrated, an ATSAML21 may contain three operational amplifiers (opamps). The opamps are capable of being configured via software to form an instrumentation amplifier, with programmable gain, without the use of external components or routing. The analog front end consists of two external resistors R1, R2, a bend sensor (e.g., 400), SAML21 opamps, and SAML21 digital to analog converter (DAC).

The front-end resistors R1, R2 convert the current charging the compliant capacitors in the bend sensor into voltage, and the instrumentation amplifier converts the differential signal from the bend sensor into a single ended voltage. The output of the instrumentation amplifier is internally routed to the analog to digital converter (ADC) of the SAML21 controller. The ADC performs the digital integration by accumulating samples from the output of the instrumentation amplifier.

When multiple regions of a bend sensor (e.g., 400) are read, such as the two-axis or two-region bend sensor, a dual channel 2-1 analog mux (ADG787), or the like, is used. In this case the same square wave that is exciting the bend sensor is used to select which region/axis of the bend sensor is routed to the instrumentation amplifier. On the rising edge of the excitation square wave the first region (reg/axis0) is measured, and on the falling edge the second region (reg/axis1) is measured.

Figure 9:
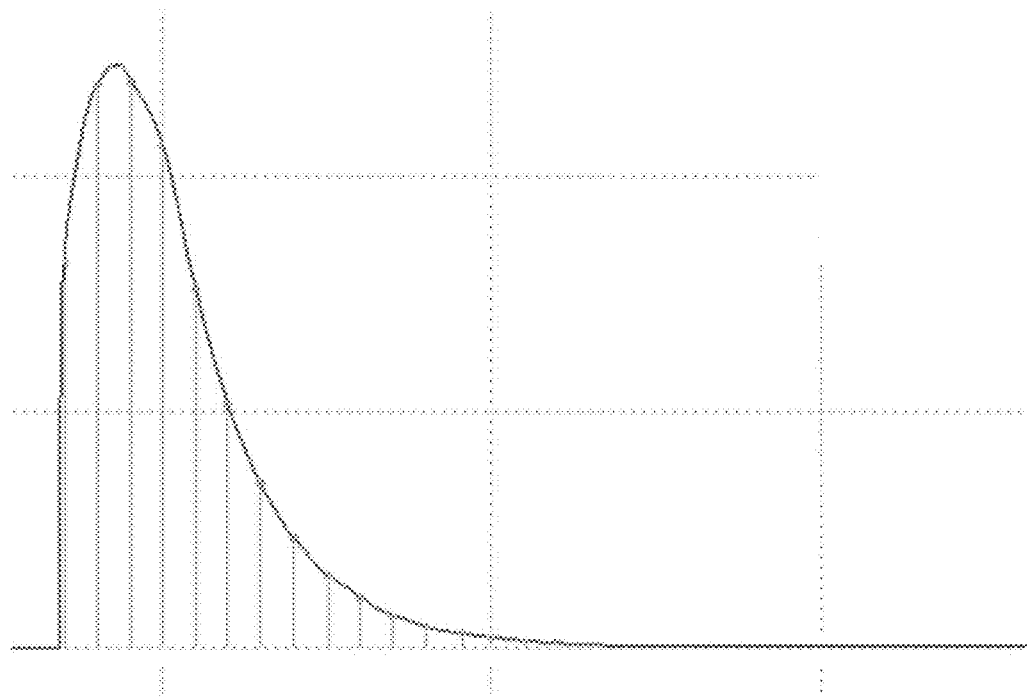
FIG. 9 is an exemplary representation of the signal in the analog-to-digital conversion (ADC) in accordance with disclosed embodiments.

FIG. 9 is an exemplary representation of the signal in the analog-to-digital conversion (ADC) in accordance with disclosed embodiments. The ADC accumulates discreet time samples shown in vertical lines on FIG. 9. The accumulation of the discreet time samples produces a value that is linearly proportional to the differential capacitance of the bend sensor (e.g., 400), which in turn is linearly proportional to the angular displacement of the bend sensor 400. Calibration coefficients stored in the emulated EEPROM of the SAML21, or the like, convert the accumulated digital value to degrees of angular displacement. Other circuitry and configurations may also be used.

Although various embodiments have been shown and described, the present disclosure is not so limited and will be understood to include all such modifications and variations are would be apparent to one skilled in the art.

What is claimed is:

1. A multi-mode compliant sensor comprising:
   a signal electrode layer comprising:
   an elastomeric layer;
   a first sensor region within the elastomeric layer and comprising conductive material;
   a narrowed region connected to the elastomeric layer and comprising a fold line region; and
   a foldable sensor region connected to the narrowed region and comprising conductive material;
   wherein the narrowed region is folded at the fold line region and the foldable sensor region is positioned above the first sensor region;
   a dielectric interposer positioned between the first sensor region and the foldable sensor region, the combination forming a first compliant capacitor;
   a control circuit comprising:
   a microcontroller configured to operate as an instrumentation amplifier with programmable gain; and
   a first resistor;
   wherein the first resistor converts a current charging the first compliant capacitor into voltage, and the instrumentation amplifier converts the differential signal into a single ended voltage output.

2. The multi-mode compliant sensor of claim 1 further comprising:
   a first trace within the elastomeric layer providing an electrical connection to the first sensor region; and
   a second trace within the elastomeric layer extending through the narrowed region and providing electrical connection to the foldable sensor region.

3. The multi-mode compliant sensor of claim 1 wherein the narrowed region is configured to form a looped region when bent at the fold line region.

4. The multi-mode compliant sensor of claim 1 wherein the narrowed region is configured to be attached to the elastomeric layer when bent at the fold line region.

5. The multi-mode compliant sensor of claim 1 wherein the foldable sensor region is formed in an inset configuration within the elastomeric layer and is substantially separated from the elastomeric layer by a perimeter that is substantially devoid of elastomeric material.

6. The multi-mode compliant sensor of claim 1 further comprising:
   a first trace within the elastomeric layer providing an electrical connection to the first sensor region; and
   a second trace within the elastomeric layer providing electrical connection to the foldable sensor region and located in substantially the same plane as the first trace except for a portion that extends through the narrowed region.

7. The multi-mode compliant sensor of claim 1 further comprising: a cover dielectric layer on at least one side of the signal electrode layer.

8. A compliant sensor comprising: a first compliant capacitor; and a control circuit comprising: a microcontroller comprising one or more amplifiers configured to operate as an instrumentation amplifier with programmable gain; and a first resistor, wherein the first resistor converts a current charging the first compliant capacitor into voltage, and the instrumentation amplifier converts the differential signal into a single ended voltage output.

9. The compliant sensor of claim 8 further comprising: a second compliant capacitor; and wherein the output of the instrumentation amplifier is routed to an analog-to-digital converter that produces a value that is linearly proportional to the differential capacitance of the first and second compliant capacitors.

10. The compliant sensor of claim 8 wherein the first compliant capacitor comprises: an elastomeric layer; a first sensor region within the elastomeric layer and comprising conductive material; a narrowed region connected to the elastomeric layer and comprising a fold line region; and a foldable sensor region connected to the narrowed region and comprising conductive material; wherein the narrowed region is folded at the fold line region and the foldable sensor region is positioned above the first sensor region; and a dielectric interposer positioned between the first sensor region and the foldable sensor region.

11. The compliant sensor of claim 9 wherein the second compliant capacitor comprises: an elastomeric layer; a second sensor region within the elastomeric layer and comprising conductive material; a second narrowed region connected to the elastomeric layer and comprising a second fold line region; and a second foldable sensor region connected to the second narrowed region and comprising conductive material; wherein the second narrowed region is folded at the second fold line region and the second foldable sensor region is positioned above the second sensor region; and a second dielectric interposer positioned between the second sensor region and the second foldable sensor region.

12. The compliant sensor of claim 10 further comprising: a first trace within the elastomeric layer providing an electrical connection to the first sensor region; and a second trace within the elastomeric layer extending through the narrowed region and providing electrical connection to the foldable sensor region.

13. The compliant sensor of claim 12 wherein the narrowed region is configured to form a looped region when bent at the fold line region.

14. The compliant sensor of claim 12 wherein the narrowed region is configured to be attached to the elastomeric layer when bent at the fold line region.

15. The compliant sensor of claim 13 wherein the foldable sensor region is formed in an inset configuration within the elastomeric layer and is substantially separated from the elastomeric layer by a perimeter that is substantially devoid of elastomeric material.

16. The compliant sensor of claim 13 further comprising: a first trace within the elastomeric layer providing an electrical connection to the first sensor region; and a second trace within the elastomeric layer providing electrical connection to the foldable sensor region and located in substantially the same plane as the first trace except for a portion that extends through the narrowed region.

17. The compliant sensor of claim 9 further comprising:
a cover dielectric layer on at least one side of either the first compliant capacitor or the second compliant capacitor.

* * * * *